US008398791B2

(12) United States Patent
Berthod et al.

(10) Patent No.: US 8,398,791 B2
(45) Date of Patent: Mar. 19, 2013

(54) PROCESS FOR MANUFACTURING MINERAL WOOL, COBALT-BASED ALLOYS FOR THE PROCESS AND OTHER USES

(75) Inventors: Patrice Berthod, Pont-a-Mousson (FR); Jean-Luc Bernard, Clermont (FR); Christophe Liebaut, Mercurey (FR)

(73) Assignees: Saint-Gobain Isover, Courbevoie (FR); Saint-Gobain Seva, Chalon sur Saone (FR)

(*) Notice: Subject to any disclaimer, the term of this patent is extended or adjusted under 35 U.S.C. 154(b) by 377 days.

(21) Appl. No.: 11/843,949

(22) Filed: Aug. 23, 2007

(65) Prior Publication Data

US 2007/0292303 A1 Dec. 20, 2007

Related U.S. Application Data

(62) Division of application No. 10/276,316, filed as application No. PCT/FR01/01590 on May 23, 2001, now abandoned.

(30) Foreign Application Priority Data

May 23, 2000 (FR) ..................................... 00 06583

(51) Int. Cl.
*C22F 1/10* (2006.01)
*C22C 19/07* (2006.01)

(52) U.S. Cl. ......................... 148/674; 420/440; 148/408

(58) Field of Classification Search .................. 148/674, 148/408; 420/436, 440
See application file for complete search history.

(56) References Cited

U.S. PATENT DOCUMENTS 3,366,478 A * 1/1968 Wheaton ...................... 420/436
3,933,484 A 1/1976 Costin
4,668,265 A 5/1987 Gaul et al.
4,904,290 A 2/1990 Gaul et al.
5,176,729 A 1/1993 Furtak et al.
6,284,684 B1 9/2001 Vignesoult et al.
6,897,173 B2 5/2005 Bernard et al.

FOREIGN PATENT DOCUMENTS

JP 60-224732 * 11/1985
JP 06-240392 * 8/1994
JP 06 240392 8/1994
JP 60-224731 * 8/1994
WO WO 94/18363 * 8/1994
WO 99 16919 4/1999
WO 99 56525 11/1999

OTHER PUBLICATIONS

English Abstract and English Machine Translation of Mihashi et al. (JP 06-240392) (1994).*
Machine Translation of JP 06-240392, Akira et al., Glass Fiber Forming Spinner Made of Co Base Alloy Excellent in Wear Resistance, Aug. 30, 1994.
U.S. Appl. No. 12/744,496, filed May 25, 2010, Bernard, et al.

* cited by examiner

*Primary Examiner* — Jessee R. Roe

(74) *Attorney, Agent, or Firm* — Oblon, Spivak, McClelland, Maier & Neustadt, L.L.P.

(57) ABSTRACT

Cobalt based alloys exhibiting high-temperature mechanical strength in an oxidizing medium are provided. The alloys are free of W and Hf and include the following elements in percentage by weight of the alloy: 23 to 34% Cr; 6 to 12% Ni; 6.0 to 10% Ta; 0.3 to 1.2% C; less than 3% Fe; less than 1% Si; less than 0.5% Mn; less than 0.1% Zr; and a balance of cobalt and impurities. Ta/C molar ratios of the alloys are at least 0.3.

12 Claims, 4 Drawing Sheets

PROCESS FOR MANUFACTURING MINERAL WOOL, COBALT-BASED ALLOYS FOR THE PROCESS AND OTHER USES

CROSS REFERENCE TO RELATED APPLICATIONS

This application is a division of U.S. patent application Ser. No. 10/276,316 filed Sep. 4, 2003 now abandoned, which is the U.S. National Stage of International Application No. PCT/FR01/01590, filed May 23, 2001. This application claims priority to French Patent Application No. 00/06583, filed May 23, 2000.

BACKGROUND

The present invention relates to a process for manufacturing mineral wool by fiberizing a molten mineral composition, using tools made of a cobalt-based alloy having a high-temperature mechanical strength in an oxidizing medium, such as molten glass, and to cobalt-based alloys that can be used at high temperature, especially for the production of articles for the manufacture and/or hot-conversion of glass or other mineral material, such as components of machines for manufacturing mineral wool.

One fiberizing technique, called internal centrifuging, consists in letting liquid glass drop continuously into an assembly of parts rotating at a very high rotation speed about their vertical axis. A master part, called a "spinner dish", receives the glass against one of its walls called the "band" which is pierced with holes through which the glass passes due to the effect of the centrifugal force in order to escape therefrom on all sides in the form of molten filaments. An annular burner located above the outside of the spinner dish, which produces a downward blast of gas hugging the outer wall of the band, deflects these filaments downwards and attenuates them. The latter then "solidify" in the form of glass wool.

The spinner dish is a fiberizing tool which is highly stressed thermally (heat shocks when stopping and starting and the creation, in steady use, of a temperature gradient along the part), mechanically (centrifugal force, and erosion due to the passage of the glass) and chemically (oxidation and corrosion by the molten glass, and by the hot gasses expelled by the burner around the spinner dish). Its main modes of deterioration are: deformation of the vertical walls by hot creep, horizontal or vertical cracking, or wear of the fiberizing orifices by erosion, which purely and simply require the components to be replaced. Their constituent material must therefore withstand the above for a production time long enough to remain compatible with the technical and economic constraints of the process. For this purpose, materials are sought which exhibit a certain ductility, creep strength and corrosion and/or oxidation resistance.

A conventional material for producing these tools is a superalloy based on nickel and chromium, reinforced by chromium and tungsten carbides, which can be used up to a maximum temperature of about 1000 to 1050° C.

To fiberize glasses at a higher temperature, especially for manufacturing mineral wool from highly viscous glasses such as basalt, it has been proposed to use superalloys based on cobalt, this being a refractory element (melting point equal to 1495° C.) which gives the matrix of the alloy a higher high-temperature intrinsic mechanical strength than a nickel-based matrix.

These alloys always contain chromium for oxidation resistance, and generally carbon and tungsten in order to obtain a reinforcing effect caused by the precipitation of carbides. They also contain nickel in solid solution, the nickel stabilizing the face-centred cubic crystal lattice of cobalt at all temperatures.

Thus, WO-A-99/16919 discloses a cobalt-based alloy having improved high-temperature mechanical properties, essentially comprising the following elements (in percentages by weight of the alloy):

| | |
|---|---|
| Cr | 26 to 34% |
| Ni | 6 to 12% |
| W | 4 to 8% |
| Ta | 2 to 4% |
| C | 0.2 to 0.5% |
| Fe | less than 3% |
| Si | less than 1% |
| Mn | less than 0.5% |
| Zr | less than 0.1%, |

the balance consisting of cobalt and inevitable impurities, the molar ratio of tantalum with respect to carbon being of the order of 0.4 to 1.

The selection of carbon and tantalum proportions is intended to form, in the alloy, a dense but discontinuous network of intergranular carbides essentially consisting of chromium carbides in the $Cr_7C_3$ and $(Cr,W)_{23}C_6$ forms and of tantalum carbides TaC. This selection gives the alloy improved high-temperature mechanical properties and oxidation resistance, allowing a molten glass at a temperature of 1080° C. to be fiberized.

SUMMARY

The objective of the invention was to be able to fiberize glass or a similar material at even higher temperatures in order to work within a more varied range of compositions of mineral materials.

In this regard, the subject of the invention is a process for manufacturing mineral wool by internal centrifuging, in which a stream of molten mineral material is poured into a fiberizing spinner dish, the peripheral band of which is pierced by a multitude of orifices through which filaments of molten mineral material escape, these filaments then being attenuated into wool due to the action of a gas, characterized in that the temperature of the mineral material in the spinner dish is at least 1100° C. and in that the fiberizing spinner dish is made of a cobalt-based alloy comprising the following elements (in percentages by weight of the alloy):

| | |
|---|---|
| Cr | 23 to 34% |
| Ni | 6 to 12% |
| Ta | 3 to 10% |
| C | 0.2 to 1.2% |
| W | 0 to 8% |
| Fe | less than 3% |
| Si | less than 1% |
| Mn | less than 0.5% |
| Zr | less than 0.1%, |

the balance consisting of cobalt and inevitable impurities, the molar ratio of tantalum to carbon being at least 0.3.

DETAILED DESCRIPTION OF EXEMPLARY EMBODIMENTS

This process is especially characterized by the use of an alloy very rich in tantalum compared with the known alloys.

In such an alloy composition, the intragranular and intergranular reinforcement essentially makes use of the tantalum, which is present especially at the grain boundaries in the form of the carbide TaC.

Very surprisingly, it has been found that these alloys exhibit excellent mechanical properties at high temperatures of about 1200 to 1300° C., which allow them to withstand the very high stresses imposed by the centrifuging technique of fiberizing, despite the presence of highly aggressive oxidizing media (glass, hot air).

This is because the inventors have been able to observe that, for fiberizing temperatures as high as 1150-1200° C. and higher, the mechanical strength is the predominant factor in the lifetime of the spinner dishes. Although other alloys, especially those according to WO-A-99/16919 have excellent resistance to oxidation and to corrosion by the glass, their mechanical properties prove to be inadequate above 1100° C., particularly above 1150° C., causing the spinner dish to be rapidly destroyed.

The process according to the invention is characterized by the use of alloys having a good compromise between mechanical strength and oxidation resistance above 1100° C., and advantageously above 1150° C. This compromise is obtained using alloys whose intergranular regions are rich in tantalum carbide precipitates which have a high melting point and fulfil a mechanical reinforcement function by preventing intergranular creep at very high temperature. The high tantalum content present in the alloy furthermore has an appreciable effect on the oxidation behaviour:

- in the matrix, the tantalum present in solid solution or in the form of fine intergranular carbides (TaC) may form oxides ($Ta_2O_5$) which mix with the self-passivating surface layer of chromium oxide ($Cr_2O_3$) to which they further provide cohesion and bonding with respect to the alloy;
- at the grain boundaries, the intergranular tantalum carbides close to the surface of the spinner dish oxidize there to form $Ta_2O_5$, the clusters of $Ta_2O_5$ forming "plugs" which prevent penetration by the aggressive medium (liquid glass, hot gases) into the intergranular spaces.

The alloy thus obtained remains stable at high temperature by virtue of the limited solid solubility of TaC at 1200-1300° C.

The process according to the invention therefore makes it possible to fiberize glass or a similar molten mineral composition having a liquidus temperature $T_{liq}$ of about 1100° C. or higher, more particularly 1140° C. or higher.

In general, these molten mineral compositions may be fiberized within a temperature range (for the molten composition entering the spinner dish) of between $T_{liq}$ and $T_{log2.5}$ where $T_{log2.5}$ is the temperature at which the molten composition has a viscosity of $10^{2.5}$ poise (dPa.s). In order to fiberize above 1150° C., the corresponding compositions are, according to the invention, preferably those whose $T_{liq}$ is at least 1140° C.

Preferable among these mineral compositions are compositions containing a significant amount of iron, these being less corrosive with respect to the constituent metal of the fiberizing components.

Thus, the process according to the invention advantageously uses an oxidizing mineral composition, especially one which is oxidizing with respect to chromium, capable of repairing or reconstituting the protective $Cr_2O_3$ oxide layer which forms on the surface. For this purpose, compositions containing iron essentially in the ferric form (oxide $Fe_2O_3$), especially with a molar ratio of II and III oxidation states, expressed by the ratio $FeO/(FeO+Fe_2O_3)$ of about 0.1 to 0.3, especially 0.15 to 0.20, are preferable.

Advantageously, the mineral composition contains a high iron content allowing a rapid rate of reconstitution of the chromium oxide, with an iron oxide content (called "total iron" content, corresponding to the total iron content expressed conventionally in the form of equivalent $Fe_2O_3$) of at least 3%, preferably at least 4%, and especially about 4 to 12%, particularly at least 5%. Within the above redox range, this corresponds to a content of ferric iron alone ($Fe_2O_3$) of at least 2.7%, preferably at least 3.6%.

Such compositions are known, especially from WO-99/56525, and advantageously comprise the following constituents:

| | | | |
|---|---|---|---|
| $SiO_2$ | 38-52%, | preferably | 40-48% |
| $Al_2O_3$ | 17-23% | | |
| $SiO_2 + Al_2O_3$ | 56-75%, | preferably | 62-72% |
| RO (CaO + MgO) | 9-26%, | preferably | 12-25% |
| MgO | 4-20%, | preferably | 7-16% |
| MgO/CaO | ≧0.8, | preferably | ≧1.0 or ≧1.15 |
| $R_2O$ ($Na_2O + K_2O$) | ≧2% | | |
| $P_2O_5$ | 0-5% | | |
| Total iron ($Fe_2O_3$) | ≧1.7%, | preferably | ≧2% |
| $B_2O_3$ | 0-5% | | |
| MnO | 0-4% | | |
| $TiO_2$ | 0-3%. | | |

Other compositions prove to be particularly suitable for the process according to the invention.

They are characterized by the following percentages by weight:

| | | | |
|---|---|---|---|
| $SiO_2$ | 39-55%, | preferably | 40-52% |
| $Al_2O_3$ | 16-27%, | — | 16-25% |
| CaO | 3-35%, | — | 10-25% |
| MgO | 0-15%, | — | 0-10% |
| $Na_2O$ | 0-15%, | — | 6-12% |
| $K_2O$ | 0-15%, | — | 3-12% |
| $R_2O$ ($Na_2O + K_2O$) | 10-17%, | — | 12-17% |
| $P_2O_5$ | 0-3%, | — | 0-2% |
| Total iron ($Fe_2O_3$) | 0-15%, | — | 4-12% |
| $B_2O_3$ | 0-8%, | — | 0-4% |
| $TiO_2$ | 0-3%, | | |

MgO being between 0 and 5%, especially between 0 and 2%, when $R_2O$≦13.0%.

Advantageously, the mineral wool composition comprises the constituents mentioned below in the following percentages by weight:

| | | | |
|---|---|---|---|
| $SiO_2$ | 39-55%, | preferably | 40-52% |
| $Al_2O_3$ | 16-25%, | — | 17-22% |
| CaO | 3-35%, | — | 10-25% |
| MgO | 0-15%, | — | 0-10% |
| $Na_2O$ | 0-15%, | — | 6-12% |
| $K_2O$ | 0-15%, | — | 6-12% |
| $R_2O$ ($Na_2O + K_2O$) | 13.0-17%, | | |
| $P_2O_5$ | 0-3%, | — | 0-2% |
| Total iron ($Fe_2O_3$) | 0-15%, | — | 2-3% |
| $B_2O_3$ | 0-8%, | — | 0-4% |
| $TiO_2$ | 0-3%, | | |

The compositions may include up to 2 or 3% of compounds to be considered as unanalysed impurities, as is known in this kind of composition.

Because of the combination of a high alumina content, of between 16 and 27%, preferably greater than 17% and/or preferably less than 25%, especially less than 22%, for a sum of network formers—silica and alumina—of between 57 and 75%, preferably greater than 60% and/or preferably less than 72%, especially less than 70%, with a high amount of alkalis ($R_2O$: soda and potash) of between 10 and 17%, with MgO between 0 and 5%, especially between 0 and 2%, when $R_2O \leqq 13.0\%$, the compositions have the remarkable property of being fiberizable over a very wide temperature range and furthermore endow the fibres obtained with biosolubility at acid pH. Depending on the particular embodiments, the alkali content is preferably greater than 12%, especially greater than 13.0% and even 13.3%, and/or preferably less than 15%, especially less than 14.5%.

This range of compositions proves to be particularly beneficial as it has been possible to observe that, contrary to the received opinions, the viscosity of the molten glass does not drop significantly with increasing alkali content. This remarkable effect makes it possible to increase the difference between the temperature corresponding to the viscosity for fiberizing and the liquidus temperature of the phase which crystallizes, and thus to considerably improve the fiberizing conditions, and especially makes it possible to fiberize a new family of biosoluble glasses by internal centrifuging.

According to one embodiment, the compositions have iron oxide contents of between 5 and 12%, especially between 5 and 8%, which may allow mineral-wool blankets to exhibit fire resistance.

Advantageously, these compositions satisfy the ratio:

$(Na_2O+K_2O)/Al_2O_3 \geqq 0.5$, preferably $(Na_2O+K_2O)/Al_2O_3 \geqq 0.6$, especially $(Na_2O+K_2O)/Al_2O_3 \geqq 0.7$ which appears to favour the obtaining of a temperature corresponding to the viscosity for fiberizing which is above the liquidus temperature.

According to a variant, the compositions according to the invention preferably have a lime content of between 10 and 25%, especially greater than 12%, preferably greater than 15% and/or preferably less than 23%, especially less than 20%, and even less than 17%, combined with a magnesia content of between 0 and 5%, with preferably less than 2% magnesia, especially less than 1% magnesia and/or a magnesia content of greater than 0.3%, especially greater than 0.5%.

According to another variant, the magnesia content is between 5 and 10% for a lime content of between 5 and 15%, and preferably between 5 and 10%.

Adding $P_2O_5$, which is optional, at contents of between 0 and 3%, especially greater than 0.5% and/or less than 2%, may allow the biosolubility at neutral pH to be increased. Optionally, the composition may also contain boron oxide which may allow the thermal properties of the mineral wool to be improved, especially by tending to lower its coefficient of thermal conductivity in the radiative component and also to increase the biosolubility at neutral pH. Optionally, $TiO_2$ may also be included in the composition, for example up to 3%. Other oxides, such as BaO, SrO, MnO, $Cr_2O_3$ and $ZrO_2$, may be present in the composition, each up to contents of approximately 2%.

The difference between the temperature corresponding to a viscosity of $10^{2.5}$ poise (decipascal.second), denoted $T_{log\ 2.5}$, and the liquidus of the crystallizing phase, denoted $T_{liq}$, is preferably at least 10° C. for these compositions. This difference, $T_{log\ 2.5}-T_{liq}$, defines the "working range" of the compositions of the invention, that is to say the range of temperatures within which it is possible to fiberize, most particularly by internal centrifuging. This difference is preferably at least 20 or 30° C., and even more than 50° C., especially more than 100° C.

The invention can be carried out in various advantageous ways depending on the choice of the composition of the alloy.

Nickel, present in the alloy in the form of a solid solution as element for stabilizing the crystal structure of the cobalt, is used within the usual range of proportions of about 6 to 12%, advantageously 8 to 10%, by weight of the alloy.

Chromium contributes to the intrinsic mechanical strength of the matrix in which it is partly present in solid solution, but also in the form of carbides, essentially of the $Cr_{23}C_6$ type, finely dispersed within the grains where they provide resistance to intragranular creep. It may also contribute to intergranular reinforcement of the alloy in the form of carbides of the $Cr_7C_3$ or $Cr_{23}C_6$ type, present at the grain boundaries, which prevent grain-over-grain slip. A heat treatment explained in detail below allows the $Cr_7C_3$ carbides to be converted into $Cr_{23}C_6$ carbides which are more stable at high temperature. Chromium contributes to the corrosion resistance as precursor of the chromium oxide which forms a protective layer on the surface exposed to the oxidizing medium. A minimum amount of chromium is needed to form and maintain this protective layer. However, too high a chromium content is deleterious to mechanical strength and to toughness at high temperatures as it results in too high a stiffness and too low a ductility incompatible with the high-temperature stresses.

In general, the chromium content of an alloy that can be used according to the invention will be from 23 to 34% by weight, preferably about 26 to 32% by weight and advantageously around 28 to 30% by weight.

Tantalum is present in solid solution in the cobalt matrix, tantalum being a heavy atom which locally distorts the crystal lattice and impedes, or even blocks, the movement of dislocations when the material is subjected to a mechanical load, thus contributing to the intrinsic strength of the matrix. It is furthermore capable of forming, with carbon, TaC carbides present firstly as a fine dispersion within the grains, where they prevent intragranular creep, and secondly at the grain boundaries, where they provide intergranular reinforcement, possibly complemented by chromium carbides.

The minimum tantalum content making it possible to achieve the mechanical strength at very high temperature according to the invention is about 3%, the upper limit possibly being chosen around 10%. The tantalum content is preferably about 4 to 10%, particularly 4.2 to 10%, very advantageously 4.5 to 10% and more particularly 5 to 10%. The amount of tantalum is more advantageously about 5.5 to 9%, especially around 6 to 8.5%, by weight.

Carbon is an essential constituent of the alloy, needed to form metal carbide precipitates.

The carbon content directly determines the amount of carbides present in the alloy. It is at least 0.2% in order to obtain the minimum desired reinforcement, but is limited to at most 1.2% in order to prevent the alloy from becoming hard and difficult to machine because of too high a density of reinforcements. The lack of ductility of the alloy with such contents prevents it from withstanding, without fracturing, an imposed strain (for example of thermal origin) and from resisting crack propagation sufficiently.

Advantageously, the carbon content is about 0.3 to 1.1% by weight and preferably about 0.35 to 1.05% by weight.

According to the invention, the composition of the alloy is adjusted so as to have a significant amount of tantalum carbides present at the grain boundaries.

In a preferred embodiment, the composition of the alloy is such that all the intergranular carbides are tantalum carbides. This may be achieved by choosing a tantalum content high enough to shift the carbide formation reactions in favour of TaC formation.

For this purpose, tantalum and carbon contents are advantageously chosen so that the Ta/C molar ratio is greater than or equal to 0.9, and is preferably around 1 to 1.2.

The TaC tantalum carbides are remarkably stable at high temperature since the inventors have observed, in metallographic sections that the structure of these carbides is hardly affected by being exposed to a high temperature of about 1300° C. Only a slight "dissolution" of the TaC carbides probably starting from Ta and C in the matrix can be observed, with no consequence on the mechanical properties. Thus, an alloy whose intergranular reinforcement consists only of TaC tantalum carbides guarantees the perpetuity of the reinforcement under extreme operating conditions at very high temperatures.

The tantalum carbides also contribute to the oxidation resistance of the alloy under such conditions as, by partially oxidizing into $Ta_2O_5$ particles, they form, at the grain boundaries, clusters which act as plugs, preventing penetration of the oxidizing medium into the material. The oxidizing medium is maintained at the surface of the tool, where it would seem the protective chromium oxide layer retains its good adhesion to the base alloy owing to the formation in the surface region of the spinner dish of $Ta_2O_5$ which favours bonding of $Cr_2O_3$ to the alloy.

Thus, an effective and lasting reinforcement is obtained, thereby making it possible to use only a relatively low carbon content which does not impair the machineability of the material.

In this embodiment, the carbon content is advantageously around 0.3 to 0.55%, preferably around 0.35 to 0.5%, by weight of the alloy.

These quite low carbon contents make it possible to obtain an intergranular precipitated reinforcement phase which is sufficiently dense, but not continuous, and is therefore inconducive to crack propagation at the grain boundaries.

In a less preferred embodiment, the alloy composition is such that the intergranular carbides do not only comprise tantalum carbides, these however being present in quite a large amount. This may be achieved by choosing a relatively high carbon content so that the proportion of TaC with respect to all the intergranular carbides gives the desired amount of tantalum carbide.

For this purpose, it is advantageous to choose the carbon content to be about 0.8 to 1.2%, preferably about 0.9 to 1.1% and particularly around 0.95 to 1%.

With such carbon contents, the intergranular carbide network is very dense but does not prove to be prejudicial for use at high temperature, greater than 1150° C. This is because above this temperature some of the $M_{23}C_6$ carbides tend to dissolve in solid solution so that the intergranular precipitated phase gradually becomes discontinuous and actively impedes crack propagation.

A tantalum-to-carbon Ta/C molar ratio of less than 0.9 may then be as low as 0.3, preferably 0.35, the proportion of TaC among all the intergranular carbides being about 50% by volume, the rest consisting of carbides of the $M_{23}C_6$ type where M is essentially chromium.

Advantageously, the Ta/C molar ratio is about 0.35 to 0.45.

Despite the presence of $M_{23}C_6$ carbides which are less stable at high temperature, the intergranular reinforcement remains effective at 1200-1300° C. because of the presence of a sufficient amount of TaC which are intact or oxidized to $Ta_2O_5$. Moreover, the presence of chromium at the grain boundaries constitutes a source of chromium diffusion useful for corrosion resistance.

Tungsten may optionally be present in the alloy of the spinner dish. It is then in solid solution in the matrix, where it improves the intrinsic mechanical strength by an effect whereby the cobalt crystal lattice is distorted. It may also together with chromium help to form intergranular $M_{23}C_6$ carbides (which are then referred to as $(Cr,W)_{23}C_6$) when the Ta/C molar ratio is less than 0.9.

However, for both the above embodiments, it is apparent that the presence of tungsten could have a deleterious effect on the mechanical strength of the alloy.

This is because it has been found that alloys containing tungsten have a microstructure which reveals the formation of a new intergranular phase consisting of one of the TCP (Topologically Close Compact) phases—the σ—CoCr phase—which embrittle the alloy. This phase is formed because of an excessively high concentration of elements supposed to pass into solution in the crystallised cobalt. Since the alloys according to the invention are already characterized by a relatively high proportion of tantalum, the additional presence of tungsten together with chromium, nickel and carbon would force some of the elements of the matrix to combine in the grain boundaries or even in the matrix. Furthermore, it has been possible to show that, after exposing alloys containing tungsten to very high temperatures of about 1300° C., the local chemical composition results, in the manner of a eutectic, in grain boundary melting. In the absence of tungsten, the melting point at the grain boundary would be higher and this local melting would not be observed at 1300° C.; consequently such melting is not observed and the grain boundaries remain intact even at 1300° C.

Thus, a preferred process according to the invention uses a tungsten-free alloy or an alloy substantially free of tungsten, it being understood that a minor amount of tungsten may be tolerated of the order of the amount of traces of a metallic impurity generally admitted in the metallurgical sense. This alloy is particularly preferred for very high working temperatures, especially when the mineral composition enters the spinner dish at a temperature of at least 1150° C., particularly if the mineral composition has a liquidus temperature of 1140° C. or higher. But this alloy also exhibits interesting mechanical properties at a lower temperature, of the order of 1000° C. in the spinner dish, especially an improved creep resistance that allows new fiberizing conditions as far as the dimensions of the spinner dish or the speed of rotation of the dish are concerned. In a very preferred process, the tungsten-free alloy is exclusively reinforced by tantalum carbide and suffers only a slight modification to the density of intergranular reinforcement.

The alloy may contain other standard constitutents or inevitable impurities. In general, it includes:

- silicon, as a deoxidizer for the molten metal during smelting and casting of the alloy, in an amount of less than 1% by weight;
- manganese, which is also a deoxidizer, in amount of less than 0.5% by weight;
- zirconium, for trapping undesirable elements such as sulphur or lead, in an amount of less then 0.1% by weight;
- iron, in an amount possibly up to 3% by weight without impairing the properties of the material;
- the cumulative amount of the other elements introduced as impurities with the essential constituents of the alloy ("inevitable impurities") advantageously represents less than 1% by weight of the composition of the alloy.

The alloys according to the invention preferably contain no B, Hf, Y, Dy, Re and other rare earths.

Among the alloys described above, some of them also form the subjects of the invention.

In particular, the subject of the invention is a cobalt-based alloy exhibiting high-temperature mechanical strength in an oxidizing medium, which also includes chromium, nickel, tantalum and carbon, characterized in that it does not contain tungsten and in that it is essentially composed of the following elements (the proportions being indicated as percentages by weight of the alloy):

| | |
|---|---|
| Cr | 23 to 34% |
| Ni | 6 to 12% |
| Ta | 3 to 10% |
| C | 0.2 to 1.2% |
| Fe | less than 3% |
| Si | less than 1% |
| Mn | less than 0.5% |
| Zr | less than 0.1%, |

the balance consisting of cobalt and inevitable impurities and the Ta/C molar ratio being at least 0.3, preferably at least 0.35.

This alloy according to the invention is essentially characterized by a high tantalum content and the absence of tungsten. This makes it possible to form reinforcing phases which are precipitated or in solid solution, are mainly based on tantalum and ensure high strength at high temperature.

The chromium, nickel and carbon contents may be chosen to be within the advantageous ranges indicated above.

The tantalum content is preferably about 4 to 10%, particularly 4.2 to 10% and very advantageously 4.5 to 10%.

Preferably, the Ta/C molar ratio is greater than or equal to 0.9; advantageously, it is about 1 to 1.2. The carbon content is therefore advantageously from 0.3 to 0.55%, preferably around 0.35 to 0.5%, by weight.

As a variant, the carbon content is about 0.8 to 1.2%, preferably 0.9 to 1% and particularly around 0.95 to 1%. The Ta/C molar ratio is then advantageously from 0.3 to 0.5, advantageously from 0.35 to 0.45.

These tungsten-free alloys are particularly appreciated for carrying out a process at high temperature, of at least 1150 to 1200° C., but they can, of course, be employed in more standard processes for manufacturing mineral wool in which the spinner dish is heated to a temperature of about 900 to 1100° C.

The subject of the invention is also another cobalt-based alloy which comprises the following elements:

| | |
|---|---|
| Cr | 23 to 34% |
| Ni | 6 to 12% |
| Ta | 4.2 to 10% |
| W | 4 to 8% |
| C | 0.8 to 1.2% |
| Fe | less than 3% |
| Si | less than 1% |
| Mn | less than 0.5% |
| Zr | less than 0.1%, |

the balance consisting of cobalt and inevitable impurities and the Ta/C molar ratio being at least 0.3, preferably about 0.3 to 0.5, advantageously at least 0.35 and in particular from 0.35 to 0.45.

The chromium, nickel, tantalum and carbon contents may be chosen to be within the advantageous ranges indicated above.

The alloys that can be used according to the invention, when they contain no highly reactive elements such as B, Hf and rare earths, including Y, Dy, Re, may be very easily formed by conventional melting and casting using standard means, especially by inductive melting, in at least partially inert atmosphere, and casting into a sand mould.

These alloys containing a certain proportion of tungsten are less preferred than the previous alloys as they make it possible instead to work around 1100 to 1150° C. As previously, they may be used in processes in which the tool is heated to a temperature of 900 to 1100° C.

After casting, a particular microstructure may advantageously be achieved by a two-step heat-treatment which makes it possible, in particular, to convert the $M_7C_3$-type carbides into $M_{23}C_6$ carbides:

- a solution phase, which comprises annealing at a temperature of 1100 to 1250° C., especially about 1200 to 1250° C., in particular for a time possibly of between 1 and 4 hours, advantageously about 2 hours; and
- a carbide precipitation phase, which comprises annealing at a temperature of 850 to 1050° C., especially about 1000° C., in particular for a time possibly ranging from 5 to 20 hours, advantageously about 10 hours.

The subject of the invention is also a process for manufacturing, in a foundry, an article from the alloys described above as subject of the invention, possibly with the above heat-treatment steps.

The process may include at least one cooling step, after the casting operation and/or after the first heat-treatment phase, and after the heat treatment.

The intermediate and/or final cooling steps may be carried out for example, by air cooling, especially with the temperature returning to ambient temperature.

The process may furthermore include a forging step after the casting operation.

The alloys forming the subject of the invention can be used to manufacture all kinds of components mechanically stressed at high temperature and/or made to work in an oxidizing or corrosive environment. The subject of the invention is also such articles manufactured from an alloy according to the invention, especially by foundry work.

Among such applications, mention may especially be made of the manufacture of articles that can be used for the production or hot-conversion of glass, for example fiberizing spinner dishes for the manufacture of mineral wool.

Although the invention has been principally described within the context of the manufacture of mineral wool, it can be applied to the glass industry in general in order to produce furnace, spinneret, or feeder components or accessories, especially for the production of textile glass yarn and glassware.

Apart from the glass industry, the invention may be applied to the manufacture of a very wide range of articles when these have to exhibit high mechanical strength in an oxidizing and/or corrosive environment, particularly at high temperature.

In general, these alloys can be used to produce any type of fixed or moving component made of refractory alloy serving in the operation or running of a high-temperature heat treatment furnace (operating above 1100° C.), a heat exchanger or a reactor for the chemical industry. Thus, they may, for example, be hot fan blades, firing supports, furnace-charging equipment, etc. They may also be used to produce any type of resistance heating element intended to operate in a hot oxidizing atmosphere, and to produce turbine components, used in the engines of land-based, seagoing or airborne vehicles, or in any other application not aimed at vehicles, for example in power stations.

Thus, the subject of the invention is the use, in an oxidizing atmosphere at a temperature of at least 1100° C., of an article made of a cobalt alloy as defined above.

The invention will be illustrated by the following examples and the FIGS. 1 to 7 of the appended drawings, in which.

EXAMPLE 1

Using the technique of inductive melting in an inert atmosphere (especially argon), a molten charge of the following composition was produced and then formed by simply casting it into a sand mould:

| | | |
|---|---|---|
| Residuals: | Cr | 28.3% |
| | Ni | 8.68% |
| | C | 0.37% |
| | Ta | 5.7% |
| | W | 0% |
| | Fe | <3% |
| | Si | <1% |
| | Mn | <0.5% |
| | Zr | <0.1% |
| | Others (combined) | <1%, |

the balance consisting of cobalt.

The casting operation was followed by a heat treatment comprising a solution treatment phase for 2 hours at 1200° C. and a secondary-carbide precipitation phase for 10 hours at 1000° C., each of these temperature holds being concluded by air-cooling down to ambient temperature.

Figure 1:
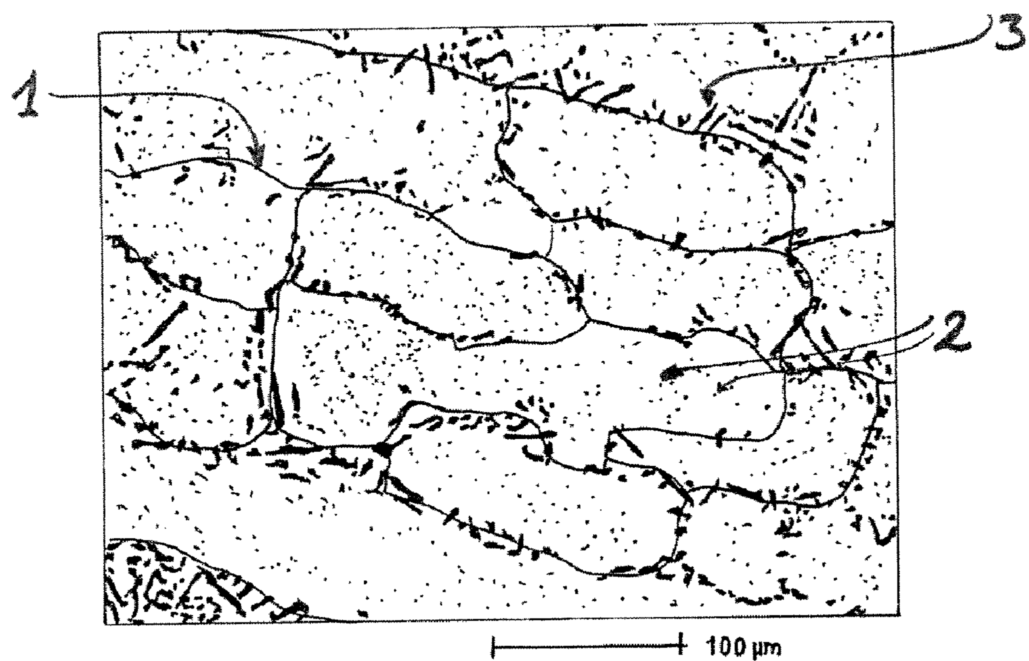
FIG. 1 shows a micrograph of the structure of an alloy according to the invention.

The microstructure of the alloy obtained, revealed by optical or electron microscopy, using conventional metallographic techniques and possibly X-ray microanalysis, is composed of a cobalt matrix with a face-centred cubic structure, stablized by the presence of nickel, including, in solid solution, chromium and tantalum, with carbide precipitates present within the grains and at the grain boundaries. This structure can be seen in FIG. 1 which shows a view of the alloy in a scanning electron microscope (SEM) with a magnification of 250: the grain boundaries, which do not appear in the micrograph with the magnification used, have been depicted by the thin lines 1. Within the grains defined by the boundaries 1, the intragranular phase consists of fine secondary carbides 2 of the $Cr_{23}C_6$ and TaC types, precipitated uniformly in the matrix and appearing in the form of small specks. At the grain boundaries there is a dense but discontinuous intergranular phase composed exclusively of tantalum carbides (TaC) 3 which appear as well-separated islands of generally elongate shape.

This microstructure is due to the tantalum-to-carbon molar ratio in the composition of the alloy, which is equal to 1.07.

The thermal stability of this microstructure was demonstrated by the following treatment:

an alloy specimen having undergone the aforementioned solution and precipitation heat treatment by annealing, was heated for 5 hours at a temperature of 1300° C., after which it was quenched in water in order to freeze the microstructure.

The structure of the specimen was examined in the SEM with a magnification of 250. This examination showed that the structure of the grain boundaries had only been slightly affected by the heat treatment: no onset of melting of the alloy and of the still-numerous TaC carbides was observed.

Figure 2:
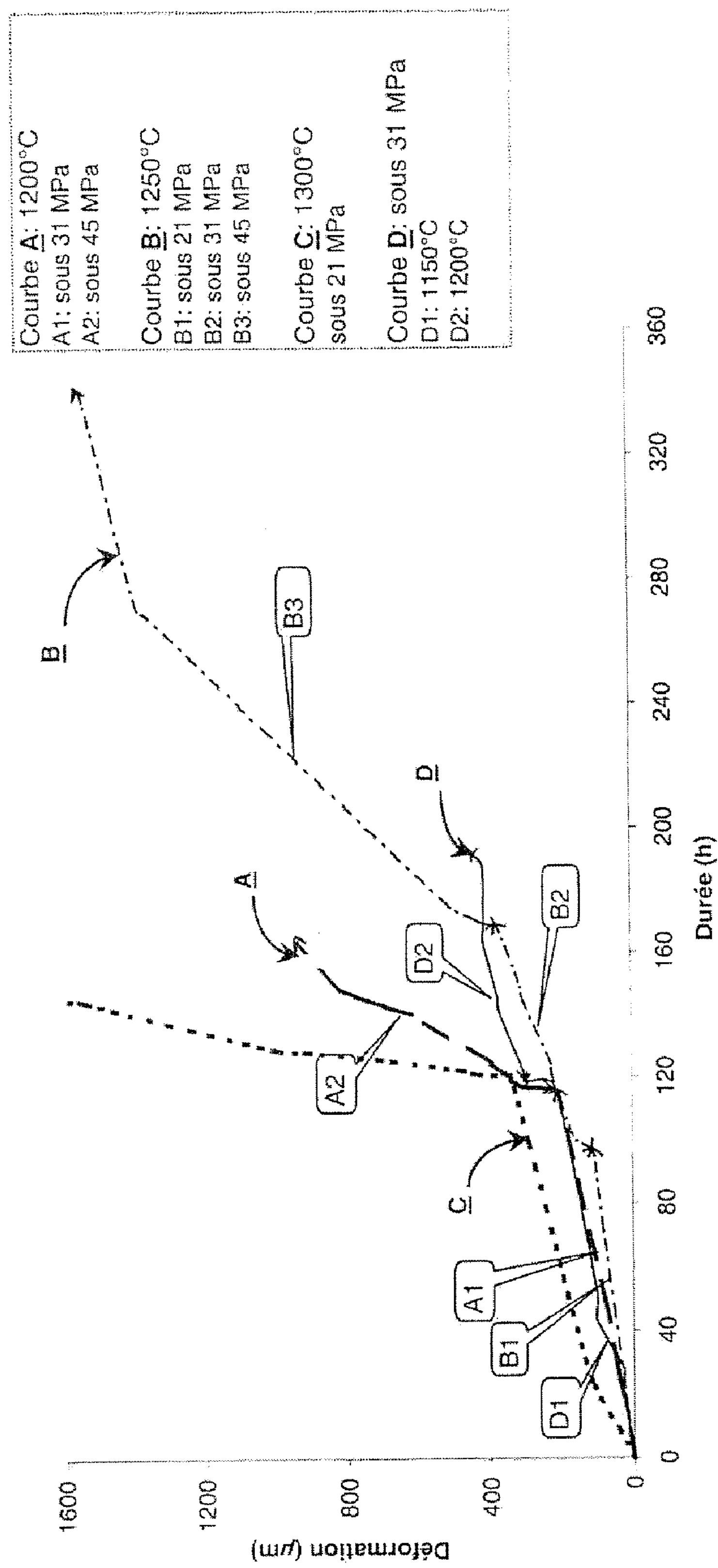
FIG. 2 is a graph illustrating the mechanical properties of this alloy.

The high-temperature mechanical strength properties of the alloy were evaluated in three-point bending creep resistance tests at various temperatures (1200, 1250, 1300° C.) under various loads (21 MPa, 31 MPa, 45 MPa). The tests were carried out on a parallelepipedal test piece 30 mm in width and 3 mm in thickness, the load being exerted midway between the supports, which were 37 mm apart, subjected to each of the indicated temperatures in succession to the three loads in increasing order. Another series of measurements was carried out under a constant load at a variable temperature. The results are illustrated in FIG. 2 which shows, on the same graph, the deformation (in μm,) of the test piece as a function of time (in hours) for each test. Table 1 gives the slope of the three-point creep curves at the temperature and stress applied and the time under load.

The alloy exhibits excellent creep properties at 1200° C. and 1250° C. and even appreciable creep resistance at 1300° C. under the load applied.

The oxidation resistance properties were evaluated in thermogravimetric tests at 1200° C.: a parabolic oxidation constant $K_p$ of $96.5\times10^{-12}$ $g^2.cm^4.s^{-1}$ and a parabolic evaporation constant $K_p$ of $3.96\times10^{19}$ $g.cm^{-2}.s^{-1}$ were obtained.

The mechanical strength properties of the alloy at a lower temperature under high load were evaluated in three-point bending creep resistance tests at 1000° C. under a load of 103 MPa, the results of which are reported below in light of the comparative examples.

The ability of this alloy to be used for constructing a tool for forming molten glass was evaluated in the application to the manufacture of mineral wool. A fiberizing spinner dish 200 mm in diameter, of conventional shape, was manufactured by casting and heat treatment as above, and then used under industrial conditions for fiberizing a glass of the composition below, the temperature of the spinner dish being between 1150 and 1210° C.:

| $SiO_2$ | $Al_2O_3$ | Total iron ($Fe_2O_3$) | CaO | MgO | $Na_2O$ | $K_2O$ | Various |
|---|---|---|---|---|---|---|---|
| 45.7 | 19 | 7.7 | 12.6 | 0.3 | 8 | 5.1 | 1 |

This is a relatively oxidizing glass compared with a conventional glass because of its high iron content and a redox of 0.15. Its liquidus temperature is 1140° C.

The spinner dish was used with an output of 2.3 metric tons per day until it was decided to stop it after the spinner dish was deemed to be ruined as demonstrated by visible damage or by the quality of the fibre produced becoming not high enough. The temperature of the mineral composition entering the spinner dish was about 1200 to 1240° C. The temperature of the metal along the profile of the spinner dish was between 1160 and 1210° C. The lifetime (in hours) of the spinner dish thus measured was 390 hours.

During the fiberizing trial, the spinner dish was subjected to many heat shocks, by being stopped and restarted some fifteen times, without any cracks appearing. This testifies to the good ductility of the alloy at 1100-1200° C.

The long withstand time of the spinner dish is due to the good creep resistance of the alloy at 1200° C. under moderate stress (the mechanical conditions resulting from the geometry of the spinner dish).

The combination of the alloy of Example 1 and glass rendered less corrosive by the presence of iron made conditions favourable to the manufacture of mineral wool at very high temperature.

COMPARATIVE EXAMPLE 1

For comparison purposes, an alloy according to WO-99/16919 was prepared and tested under the same conditions, the alloy having the following composition:

| | | |
|---|---|---|
| Residuals: | Cr | 29% |
| | Ni | 8.53% |
| | C | 0.38% |
| | Ta | 2.95% |
| | W | 5.77% |
| | Fe | <3% |
| | Si | <1% |
| | Mn | <0.5% |
| | Zr | <0.1% |
| | Others (combined) | <1%, |

the balance consisting of cobalt.

Figure 3:
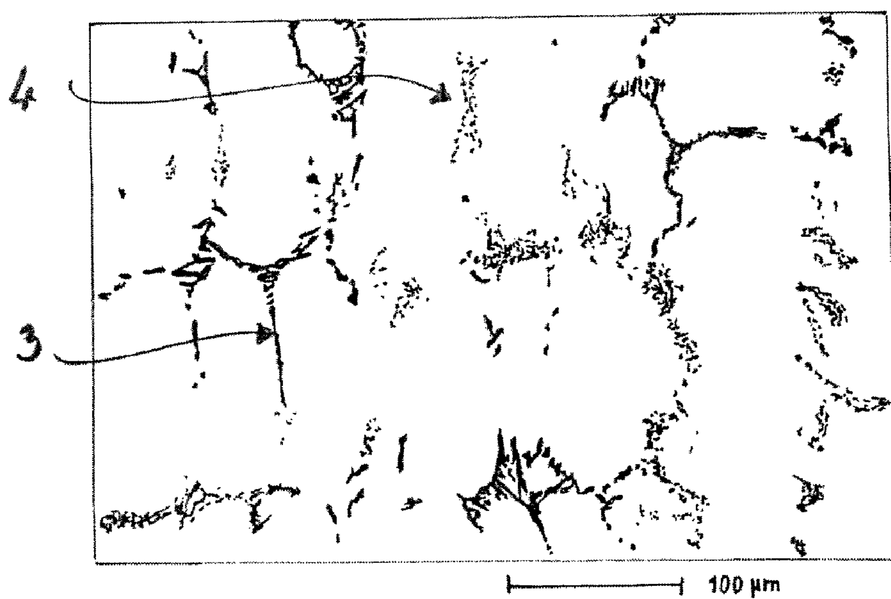
FIGS. 3 and 4 show micrographs of the structure of a comparative alloy.

With a Ta/C ratio of 0.51, the microstructure of this alloy, illustrated in FIG. 3, shows the presence at the grain boundaries of about 50% of $(Cr,W)_{23}C_6$ carbides (visible at 4 in the form of thin eutectic areas) and 50% of TaC carbides (visible at 3).

Figure 4:
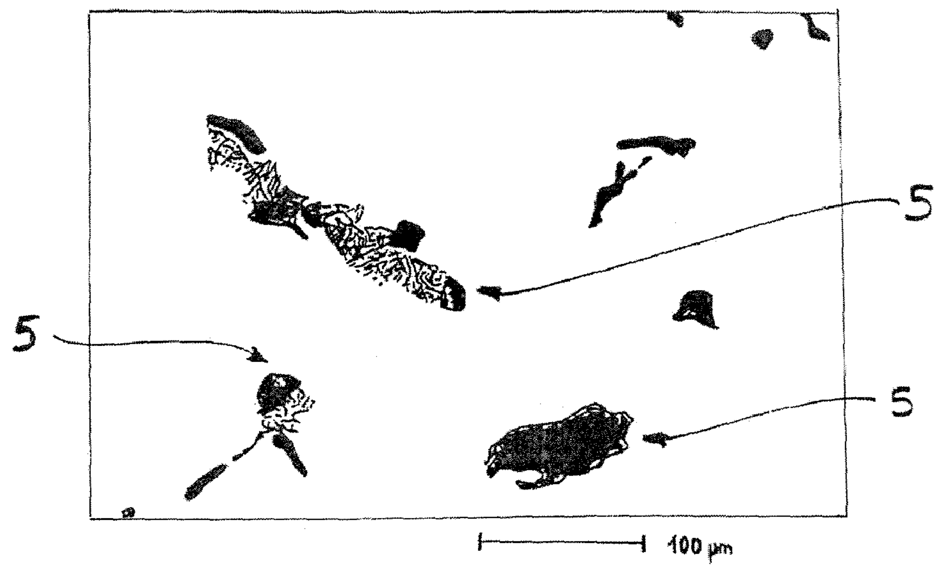

The thermal stability of the microstructure of this alloy at very high temperature is poorer than that of Example 1, as illustrated in FIG. 4 which shows the SEM micrograph of a specimen of the alloy of Comparative Example 1 after 5 hours at 1300° C. and water-quenching.

It may be seen that the intergranular carbides, including the tantalum carbides, have disappeared and that liquid (melted) regions 5 appeared at 1300° C., which resolidified upon quenching.

By creep strength tests, it was verified that the mechanical strength of the comparative alloy at high temperature is less than that of the alloy of Example 1. These results are collected in the graph in FIG. 5 which shows compared results of creep resistance at 1200° C. under 31 MPa, in the graph of FIG. 6 which shows compared results of creep resistance at 1000° C. under 103 MPa and in Table 1.

The 1200° C. oxidation resistance properties evaluated by thermogravimetric analysis are: $K_p$~$92.4.10^{-12}$ $g^2.cm^{-4}.s^{-1}$ and $K_v$=$4.86.10^{-9}$ $g.cm^{-2}.s^{-1}$.

COMPARATIVE EXAMPLE 2

Figure 5:
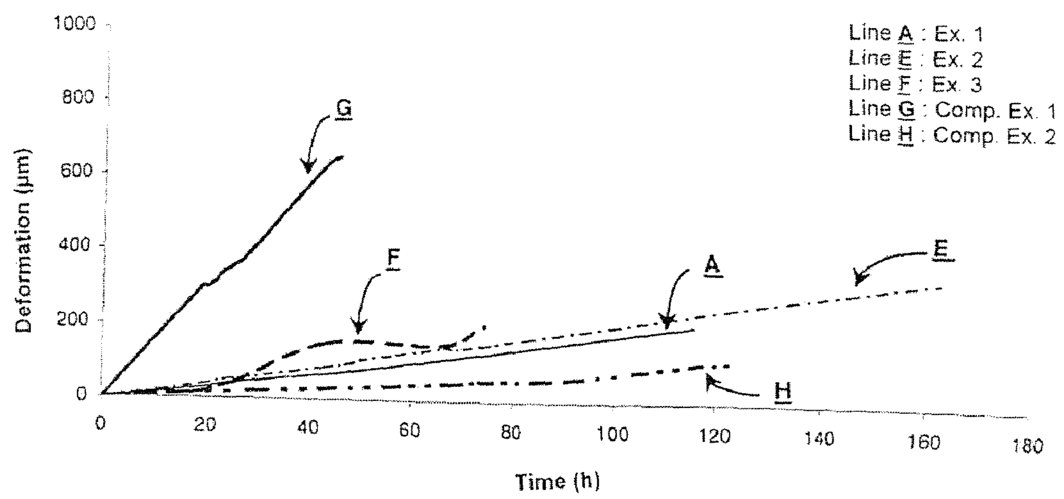
FIGS. 5 and 6 are graphs comparing the mechanical properties of various alloys.
Figure 6:
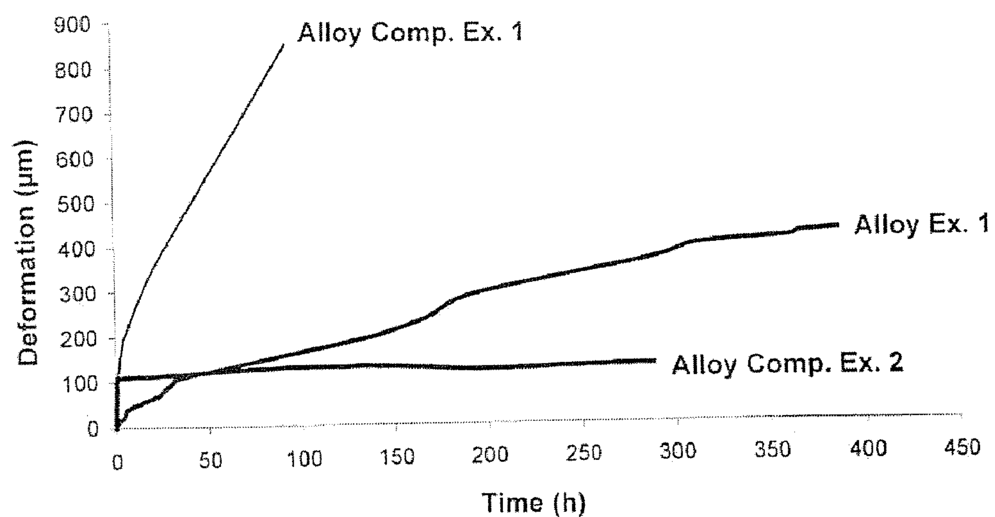

FIGS. 5 and 6 and Table 1 also show the high-temperature mechanical properties of another comparative alloy of a different type: this is an ODS-type super alloy which has a matrix consisting of nickel-chromium and is reinforced by an oxide phase, such as yttrium oxide.

These very high-performance alloys cannot be obtained by casting but by the tricky technique of powder metallurgy, by producing a mechanical alloy by mechanical synthesis of metal and ceramic powders, sintering under pressure, complex thermo-mechanical working and heat treatment at very high temperature, with consequently a very high manufacturing cost.

The grade tested in Comparative Example 2 is MA 758 from Special Metals.

It should be noted that the ODS alloy of Comparative Example 2 has a much better creep resistance than the cobalt alloy of Comparative Example 1: the slope of the creep curve at 1200° C. is fifteen times greater in the case of the cobalt-based comparative alloy.

The alloy of Example 1 remains inferior to the ODS alloy, having a creep curve slope at 1200° C. two to three times greater, but this constitutes a considerable improvement over the alloy of Comparative Example 1.

A similar difference in the behaviours at 1000° C. is observed.

EXAMPLE 2

Another alloy according to the invention was prepared as in Example 1 and its properties were evaluated in the same way, the said alloy having the following composition:

| | | |
|---|---|---|
| Residuals: | Cr | 28.5% |
| | Ni | 8.9% |
| | C | 0.5% |
| | Ta | 8.5% |
| | W | 0% |
| | Fe | <3% |
| | Si | <1% |
| | Mn | <0.5% |
| | Zr | <0.1% |
| | Others (combined) | <1%, |

the balance consisting of cobalt.

Its microstructure is similar to that of the alloy of Example 1, with an intergranular phase consisting exclusively of tantalum carbides TaC (Ta/C molar ratio=1.13).

The results of the mechanical strength tests are given in FIG. 5 and in Table 1.

EXAMPLE 3

Another alloy according to the invention was prepared as in Example 1 and its properties were evaluated in the same way, the said alloy having the following composition:

| | | |
|---|---|---|
| Residuals: | Cr | 29% |
| | Ni | 8.86% |
| | C | 0.98% |
| | Ta | 6% |
| | W | 0% |
| | Fe | <3% |
| | Si | <1% |
| | Mn | <0.5% |
| | Zr | <0.1% |
| | Others (combined) | <1%, |

the balance consisting of cobalt.

Its microstructure differs from those of the alloys of Examples 1 and 2 by the presence, at the grain boundaries, in addition to the same amount of tantalum carbides, of $Cr_{23}C_6$ chromium carbides. The high carbon content produces a high density of carbides in which the distribution is about 50% $Cr_{23}C_6$ for 50% TaC, because the Ta/C molar ratio is equal to 0.39.

The results of the mechanical strength tests are given in FIG. 5 and in Table 1.

TABLE 1

| Example | Temperature | 21 MPa Load Time (h) | 21 MPa Load Slope (μm · $h^{-1}$) | 31 MPa Load Time (h) | 31 MPa Load Slope (μm · $h^{-1}$) | 45 MPa Load Time (h) | 45 MPa Load Slope (μm · $h^{-1}$) |
|---|---|---|---|---|---|---|---|
| 1 | 1200 | — | — | 70 | 2.0 | 40 | 14.0 |
| | 1250 | 96 | 1.0 | 67 | 3.5 | 96 | 9.0 |
| | 1300 | 97 | 2.5 | — | — | — | — |
| 2 | 1200 | 63.5 | <1.0 | 163 | 2.0 | — | — |
| 3 | 1150 | — | — | — | — | 64 | 6.0 |
| | 1200 | — | — | 75 | 4.5 | — | — |
| | 1250 | 66 | 1.5 | 66 | 10.0 | 17 | 140.0 |
| Comp. Ex. 1 | 1150 | 64 | <1.0 | — | — | — | — |
| | 1200 | 16 | 6.0 | 50 | 14.0 | — | — |
| Comp. Ex. 2 | 1200 | — | — | 124 | <1.0 | — | — |

EXAMPLE 4

Another alloy, containing tungsten, was used, this having the following composition:

| | | |
|---|---|---|
| Residuals: | Cr | 28.2% |
| | Ni | 8.74% |
| | C | 0.37% |
| | Ta | 5.84% |
| | W | 5.6% |
| | Fe | <3% |
| | Si | <1% |
| | Mn | <0.5% |
| | Zr | <0.1% |
| | Others (combined) | <1%, |

the balance consisting of cobalt.

Figure 7:
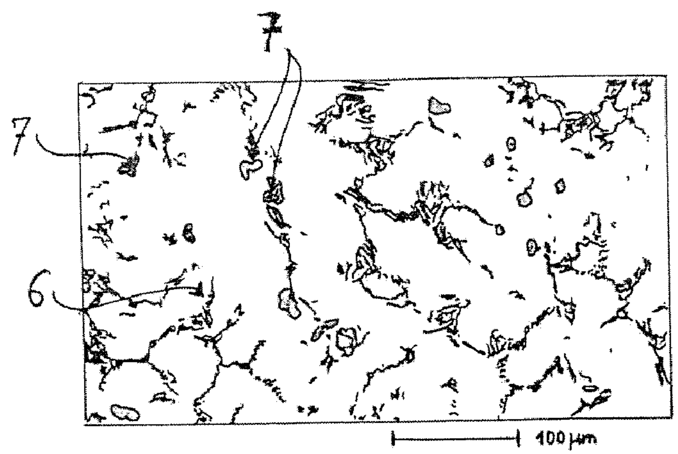
FIG. 7 shows a micrograph of the structure of another alloy used according to the invention.

Its microstructure, illustrated in FIG. 7, showing a view obtained in a scanning electron microscope, reveals quite a dense intergranular network of eutectic tantalum carbides (TaC) 6 with the cobalt solid solution. When the microstructure is observed in optical microscopy, after suitable metallographic etching, it seems that there are different types of MC carbides present, probably due to tungsten contributing to the formation of these carbides.

The microstructure clearly shows a phase 7 in the form of dispersed compact areas rich in cobalt and in chromium in almost equal parts, which consist of one of the TCP (Topologically Close Compact) phases—the σ-CoCr phase known to embrittle the alloy.

These phases do not appear in the microstructure of the alloy of Example 1 although very similar in composition if tungsten is absent. In this Example 4, the presence of 5.6% tungsten adding to the 28% chromium, 8% nickel and 6% tantalum seems to make the overall content of elements passing into solid solution exceed a kind of solubility limit.

The oxidation resistance at 1200° C. of this alloy was evaluated by thermogravimetric analysis: The values obtained were $K_p=190.10^{-12}$ $g^2.cm^{-4}.s^{-1}$ and $K_v=4.17.10^{-9}$ $g.cm^{-2}.s^{-1}$.

In a 3-point bending creep resistance test at 1200° C. under a load of 31 MPa, this alloy had a creep rate of about 7 to 8 $\mu m.h^{-1}$, this being slightly less good than the alloys of Examples 1 to 3 but a marked improvement over the alloy of Comparative Example 1.

These properties mean that it can be used in an oxidizing atmosphere up to temperatures of about 1100 to 1150° C.

The invention claimed is:

1. A cobalt based alloy exhibiting high-temperature mechanical strength in an oxidizing medium, the alloy being free from W and Hf and consisting of the following elements in percentage by weight of the alloy:

| | |
|---|---|
| Cr | 23 to 34% |
| Ni | 6 to 12% |
| Ta | 6.0 to 10% |
| C | 0.3 to 1.2% |
| Fe | less than 3% |
| Si | less than 1% |
| Mn | less than 0.5% |
| Zr | less than 0.1% |

a balance of cobalt and impurities;

wherein a Ta/C molar ratio of the alloy is at least 0.3.

2. The alloy according to claim 1, wherein the following elements are present in the following amounts:

| | |
|---|---|
| Cr | 26 to 32% |
| Ni | 8 to 10% |
| Ta | 4.5 to 9% |
| C | 0.3 to 1.1%. |

3. The alloy according to claim 1, wherein the Ta/C molar ratio is at least 0.9.

4. The alloy according to claim 3, wherein carbon is present in an amount of from 0.3 to 0.55 wt %.

5. The alloy according to claim 1, wherein carbon is present in an amount of from about 0.8 to 1.2%.

6. The alloy according to claim 1, wherein the Ta/C molar ratio is from 0.3 to 0.5.

7. An article, comprising the alloy according to claim 1.

8. The article according to claim 7, wherein the article is obtained by foundrywork.

9. The article according to claim 7, wherein the article was subjected to a heat treatment after the alloy was cast.

10. The article according to claim 7, wherein the article was subjected to a forging operation after the alloy was cast.

11. The article according to claim 7, comprising a fiberizing spinner dish for the manufacture of mineral wool.

12. A process for manufacturing an alloy article, comprising:

casting a molten alloy that is free from W and Hf and consists of the following elements (the proportions being indicated as percentages by weight of the alloy):

| | |
|---|---|
| Cr | 23 to 34% |
| Ni | 6 to 12% |

-continued

| | |
|---|---|
| Ta | 4.2 to 10% |
| C | 0.2 to 1.2% |
| Fe | less than 3% |
| Si | less than 1% |
| Mn | less than 0.5% |
| Zr | less than 0.1% |

the balance consisting of cobalt and impurities and the Ta/C molar ratio being at least 0.3, in a suitable mold; and then heat treating the molded article by first annealing the article at a temperature of 1100 to 1250° C. and annealing the article a second time at a temperature of 850 to 1050° C.

* * * * *